July 16, 1957  A. H. DE ROCHER  2,799,520
SCREW-FED TYPE HOSE COUPLING WITH WIRE ANCHOR COIL
Filed Dec. 22, 1954
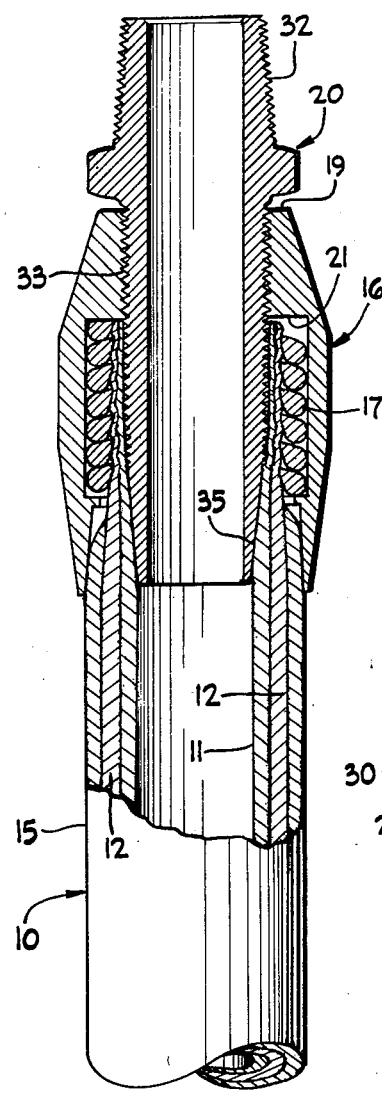
FIG. 1
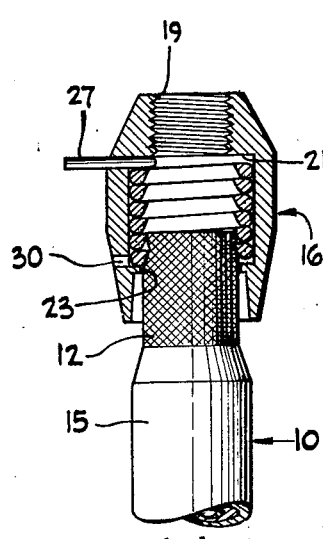
FIG. 2
FIG. 3
INVENTOR
ARTHUR H. DE ROCHER
BY  *Hill, Sherman, Meroni, Gross & Simpson*  ATTORNEYS

2,799,520

SCREW-FED TYPE HOSE COUPLING WITH WIRE ANCHOR COIL

Arthur Hanna de Rocher, Honolulu, Territory of Hawaii

Application December 22, 1954, Serial No. 476,988

1 Claim. (Cl. 285—251)

This invention relates to improvements in reusable hose couplings and more particularly relates to such couplings, which are particularly adapted for high pressure hoses for connecting a hose to an inner nipple.

Reusable hose couplings have heretofore been composed of a socket with internal grooving or a coarse thread which engages the outside of the hose and a fine internal thread at one end of the socket into which is threaded a tapered nipple, which enters the hose and expands it into threads or internal grooving.

With such types of hose couplings, the hose resists the torque of the entering tapered nipple, with the result that the hose is stationary while the nipple is being threaded thereinto.

While the nipple taper is lubricated prior to entering the hose, the hose wipes away the lubricant and the friction between the entering end of the nipple and the inner tube of the hose becomes excessive, with the result that the inner tube is injured, and where the inner tube is covered with a metal mesh braid the braid may also be injured, causing leakage of the hose.

Moreover, where the inner tube is covered with wire mesh braid, the outer layer of rubber is usually stripped back from the braid and the mesh coming into the internal grooving of the socket is very abrasive, with the result that the mesh braid cuts off the sharp edges of the grooving in the socket and reduces its gripping ability.

A principal object of my invention is to remedy the aforementioned disadvantages in hose couplings by providing a hose coupling in which the anchoring device for the hose within the socket is rotatable within the socket as the nipple is threaded in the socket to enter the hose and accommodate the hose and anchoring device to rotate with the nipple as it enters the socket.

A further object of my invention is to provide a simple and inexpensive reusable hose coupling so arranged that the hose may rotate within its gripping socket as the nipple is threaded within the socket and enters the hose.

A still further object of my invention is to provide an improved form of reusable hose coupling particularly adapted for high pressure hoses reinforced by metal mesh braid, so arranged as to avoid injury to the inner tube and metal braid of the hose upon connecting the coupling to and disconnecting the coupling from the hose.

A still further object of my invention is to provide a novel and improved form of hose coupling in which a socket has a plane cylindrical inner wall having an anchoring coil rotatably mounted therein to rotate with the hose and nipple as the nipple enters the socket and hose to clamp the hose thereto.

A still further object of my invention is to provide a simplified form of reusable hose coupling employing a floating anchoring coil within the socket, with means for holding the anchoring coil from rotation as the hose enters the socket and accommodating the coil and hose to rotate as the nipple enters the hose and socket.

These and other objects of my invention will appear from time to time as the following specification proceeds and with reference to the accompanying drawings wherein:

Figure 1 is a sectional view taken through a hose coupling constructed in accordance with my invention, showing the hose in connected relation within the coupling;

Figure 2 is a view showing the hose entering the socket of the coupling with the anchor coil locked from rotation; and Figure 3 is an exploded view showing a stripped end of the hose, the anchor coil, the socket and nipple prior to insertion of the hose therein.

In the embodiment of my invention illustrated in the drawing, I have shown a hose 10 having an inner tube 11 which may be made from rubber an elastomer or like material. The inner tube 11 is shown as being reinforced by a wire mesh braid 12, which is covered by a cover 15, which may also be rubber an elastomer or like material.

As shown in Figure 2, the cover has been removed from the end of the hose exposing the wire mesh braid 12 and the wire mesh braid is shown as being partially threaded within a socket 16 into engagement with a floating anchoring coil 17.

It should here be understood that while I have shown the cover removed from the wire braid at the end of the hose which enters the socket, that the cover need not be removed, but the socket 16 may be installed over an unstripped hose if desired.

The socket 16 is provided with an inwardly extending flange 19 at one end which is internally threaded, preferably with a right hand thread, for threadingly receiving a nipple 20. The inner wall of the flange 19 provides a shoulder 21 limiting inward movement of the hose 10 within the socket 16, and forming an abutment surface for the inner end of the anchoring coil 17. Spaced outwardly from the shoulder 21 along the socket 16 is an inwardly extending rib or land 23, the inner wall of which forms a shoulder or abutment for the anchor coil 17. Between the shoulder 21 and rib 23 is a plane cylindrical wall 24 accommodating free rotation of the anchor coil 17 within the socket 16, as the nipple 20 is inserted within the end of the hose 10. The inner wall of the socket 24 outwardly of the rib 23 is shown as being flared outwardly as indicated by reference character 25, to receive and be engaged by the cover 15 of the hose.

The anchor coil 17 may be made from a heat treated steel wire of tear drop cross-section, coiled on a mandrel and cut-off square at each end affording blunt ends 26 at each end of said anchor coil. The anchor coil 17 is preferably wound with a lead opposite to the lead of the threads in the flange 19 of the nipple 16, and is herein shown as having a left hand lead. The anchor coil 17 may be inserted in the socket 16 by placing one end of the coil over the rib 23 and threading the coil into the socket over this rib. When the anchor coil has been threaded within the socket between the shoulder 21 and rib 23, said anchor coil may be locked from turning movement by a pin 27, insertable within a hole 29 extending through the wall of the socket 16 into the interior thereof and engageable with a blunt end of the anchor coil 17.

The hose 10 may then be rotatably moved within the socket 16 and in effect be threaded on the stationary anchor coil 17. The socket 16 is likewise provided with a hole 30 adjacent the inner margin of the rib 23, to engage the opposite flattened end of the anchor coil 17 and prevent rotation of the anchor coil when the hose is being removed from the socket 16.

The nipple 20 is shown as having a hex portion 31 adjacent, but inwardly of a threaded outer end 32 thereby, which may be gripped by a wrench or like tool. The nipple 20 has a threaded portion 33 on the opposite side of the hex head 31 from the outer threaded portion 32 thereof for threading within the internal threads in the flange 19. The nipple 20 also has a tapered end portion 35, outwardly on the threaded portion 33 thereof, adapted to fit within the inner tube 11 of the hose 10, upon threading of the nipple within the socket 16.

In coupling the hose 10 to the coupling, assuming the anchor coil has been threaded along the flange or land 23 and is floatingly carried in the space between the flange 23 and shoulder 21, the locking pin 27 is first placed within the hole 29 to lock the anchor coil 17 from turning movement. The socket may then be threaded on the stripped end of the hose by turning the socket with respect thereto, or else by turning the hose with respect to the socket until the end of the hose has reached the shoulder 21. A lubricant may then be applied to the inside of the inner tube 11 of the hose and to the tapered end portion 35 of the nipple. The pin 27 being removed from the hole 29 to accommodate rotatable movement of the anchor coil 17, the nipple 20 is threaded within the threaded inner end portion of the flange 19 and turned in a direction opposite from the pitch of the anchor coil 17. As the nipple is forced into the inner tube of the hose by turning movement thereof, the nipple 20, hose 10 and anchor coil 17 will rotate together in the socket 16, the nipple being forced into the inner tube with no relative rotation between the tube and nipple, and thus avoiding injury to the inner tube as well as the wire mesh braid reinforcing casing 12 for the inner tube 11.

When it is desired to disassemble the coupling from the hose the nipple 20 may be turned to be threaded out of the socket 16. When being so turned the nipple will rotate the hose 10 and anchor coil 17 within the socket and obviate the liability of injuring either the wire mesh braid reinforcement 12 or the inner tube 11, and also, avoiding the abrading of the peaked ends of the anchor coil by rotation of the wire mesh braid with respect thereto. When the nipple 20 has been removed from the hose and socket, the locking pin 27 may be placed in the hole 30 to hold the anchor coil from rotation. The socket 16 may then be threaded from the end of the hose.

It may be seen from the foregoing that a simple and improved form of reusable hose coupling has been provided which is so arranged as to avoid injury to the hose or coupling both during coupling of the hose to the nipple and removal of the hose therefrom.

It may further be seen that the tear drop cross-section of the anchor coil provides a positive gripping surface grippingly engaged with the end of the hose by the taper of the end portion of the nipple as it is threaded within the socket, and affords a positive leak-proof gripping connection between the hose and socket.

It will be understood that modifications and variations in the present invention may be effected without departing from the spirit and scope of the novel concepts thereof as defined by the claim appended hereto.

I claim as my invention:

In a reusable hose coupling, a nipple having a tapered end portion with a threaded portion extending therefrom, a socket having an internally threaded end portion for threading on the threaded portion of said nipple and having a cylindrical inner wall extending inwardly of said threaded portion, an anchor coil formed from wire, tear drop in cross-section with the apex thereof facing inwardly toward the threaded end portion of said socket, abutment means within said socket retaining said anchor coil within said socket, but accommodating free rotation of said coil within said socket, releasable means for holding said anchor coil from rotation with respect to said socket to accommodate inserting of a hose end therein, and releasable to accommodate turning movement of the hose and anchor coil with respect to said socket upon threading of said nipple within said socket and engagement of the tapered end thereof within the hose, the pitch of said anchor coil being on the opposite hand from the pitch of the threads of said socket.

References Cited in the file of this patent

UNITED STATES PATENTS

| | | |
|---|---|---|
| 919,444 | Loetzer | Apr. 27, 1909 |
| 951,283 | Krischer | Mar. 8, 1910 |
| 2,116,299 | Bannister | May 3, 1938 |
| 2,211,978 | Joseph | Aug. 20, 1940 |
| 2,452,908 | Cowles | Nov. 2, 1948 |
| 2,561,827 | Soos | July 24, 1951 |
| 2,698,191 | Samiran | Dec. 28, 1954 |

FOREIGN PATENTS

| | | |
|---|---|---|
| 257,409 | Great Britain | Sept. 2, 1926 |
| 120,127 | Australia | Dec. 11, 1943 |
| 1,052,094 | France | Sept. 23, 1953 |
| 705,373 | Great Britain | Mar. 10, 1954 |
| 1,075,106 | France | Apr. 14, 1954 |